United States Patent
Bortolin et al.

(10) Patent No.: US 9,727,835 B2
(45) Date of Patent: Aug. 8, 2017

(54) BUSINESS SYSTEMS MANAGEMENT MOBILE ADMINISTRATION

(71) Applicant: International Business Machines Corporation, Armonk, NY (US)

(72) Inventors: Max S. Bortolin, Sao Paulo (BR); Guilherme S. Elias, Sumare (BR); Marcos Vinicius L. Paraiso, Campinas (BR); Marcos D. Sylos, Campinas (BR); Fabio M. Tanada, Campinas (BR); Sergio Varga, Campinas (BR)

(73) Assignee: International Business Machines Corporation, Armonk, NY (US)

( * ) Notice: Subject to any disclaimer, the term of this patent is extended or adjusted under 35 U.S.C. 154(b) by 458 days.

(21) Appl. No.: 13/690,081

(22) Filed: Nov. 30, 2012

(65) Prior Publication Data

US 2014/0156354 A1    Jun. 5, 2014

(51) Int. Cl.
    *G06Q 10/06* (2012.01)
(52) U.S. Cl.
    CPC ................ *G06Q 10/0637* (2013.01)
(58) Field of Classification Search
    USPC ........................................ 705/7.36
    See application file for complete search history.

(56) References Cited

U.S. PATENT DOCUMENTS

| 5,446,895 | A * | 8/1995 | White | G01R 31/00 717/101 |
| 5,771,179 | A * | 6/1998 | White et al. | 702/183 |
| 7,747,382 | B2 * | 6/2010 | Small et al. | 701/120 |
| 8,073,461 | B2 * | 12/2011 | Altman | G06Q 30/0207 455/456.1 |
| 8,316,380 | B2 * | 11/2012 | Keil | G06Q 10/10 719/313 |
| 8,467,817 | B2 * | 6/2013 | Said | G06Q 10/107 455/466 |
| 8,516,110 | B2 * | 8/2013 | Aguiar | H04L 41/044 348/207.99 |
| 2005/0005259 | A1 * | 1/2005 | Avery | G06F 9/5038 717/103 |

(Continued)

OTHER PUBLICATIONS

Wu et al., Geo-tagged Mobile Photo Sharing in Collaborative Emergency Management, https://www.researchgate.net/publication/238591890_Geo-tagged_mobile_photo_sharing_in_collaborative_emergency_management, 2011.*

(Continued)

*Primary Examiner* — Jeffrey Zimmerman
(74) *Attorney, Agent, or Firm* — Schmeiser, Olsen & Watts; John Pivnichny (57) ABSTRACT

A method and system for remotely managing business processes via a mobile device is provided. The method includes enabling, for a user, an application integrated with analytic models and geo-positioning technology. The user and a location of the user are identified. Preferences associated with the user are identified and a status of business processes associated with the entity at the location is monitored. In response, a status of the entity at the location is determined. Status data associated with the status is presented to the user via the mobile device. The status data is based on the preferences. The user may initiate an escalation process based on the status provided.

16 Claims, 9 Drawing Sheets

(56) References Cited

U.S. PATENT DOCUMENTS

| | | | | |
|---|---|---|---|---|
| 2005/0137926 A1* | 6/2005 | Zhan | G06Q 10/06311 | 705/7.13 |
| 2006/0111955 A1* | 5/2006 | Winter | G06Q 10/06 | 705/7.19 |
| 2008/0010004 A1* | 1/2008 | Small | G08G 5/00 | 701/120 |
| 2008/0133300 A1* | 6/2008 | Jalinous | G06Q 10/0635 | 705/7.28 |
| 2008/0168367 A1* | 7/2008 | Chaudhri | G06F 3/04817 | 715/764 |
| 2008/0168368 A1* | 7/2008 | Louch | G06F 3/048 | 715/764 |
| 2008/0168382 A1* | 7/2008 | Louch | G06F 9/4443 | 715/781 |
| 2009/0170532 A1* | 7/2009 | Lee | H04M 1/72566 | 455/456.3 |
| 2009/0254753 A1* | 10/2009 | De Atley | G06F 21/51 | 713/176 |
| 2010/0062788 A1* | 3/2010 | Nagorniak | H04W 48/04 | 455/456.1 |
| 2010/0274596 A1* | 10/2010 | Grace | G06Q 10/06311 | 705/7.15 |
| 2011/0061013 A1* | 3/2011 | Bilicki | G06Q 10/06 | 715/771 |
| 2011/0099180 A1* | 4/2011 | Arrasvuori | G01C 21/3679 | 707/754 |
| 2011/0136502 A1* | 6/2011 | Hubner | H04W 4/02 | 455/456.1 |
| 2012/0042006 A1* | 2/2012 | Kiley | G06F 17/30867 | 709/203 |
| 2012/0129520 A1* | 5/2012 | Rao | H04W 64/00 | 455/432.3 |
| 2013/0246130 A1* | 9/2013 | Michel | G06Q 10/067 | 705/7.36 |
| 2014/0018112 A1* | 1/2014 | Cohen-Zur | H04W 4/04 | 455/457 |
| 2014/0081683 A1* | 3/2014 | Barak | G06Q 10/06 | 705/7.12 |

OTHER PUBLICATIONS

Guggenmos et al., A Hybrid and Semantic Location Management System for Mobile User Generated Geo Services, Aug. 13, 2012, http://www.academia.edu/913380/A_Hybrid_and_Semantic_Location_Management_System_for_Mobile_User_Generated_Geo_Services, 10 pages.*

Payne et al., A Location-Aware Mobile System for On-Site Mapping and Geographic Data Management, https://www.google.com/url?sa=t&rct=j&q=&esrc=s&source=web&cd=1&cad=rja&uact=8&ved=0ahUKEwjNv-XT-bfSAhVOySYKHXLUDi4QFggcMAA&url=http%3A%2F%2Fdl.acm.org%2Fcitation.cfm%3Fid%3D1631773&usg=AFQjCNE7iE78s3_vqVEHh7ww_UrTmjtRg&sig2=3DVnfODZ5rqBa, 2009.*

Wu et al., Geo-tagged Mobile Photo Sharing in Collaborative Emergency Management, 8 pages.

Guggenmos et al., A Hybrid and Semantic Location Management System for Mobile User Generated Geo Services, Aug. 13, 2012, http://deusto.academia.edu/DiegoLopezdeipina/Papers/948278/A_Hybri . . . , 10 pages.

Payne et al., A Location-Aware Mobile System for On-Site Mapping and Geographic Data Management, pp. 166-172.

* cited by examiner

Mobil User Menue:

1. User registration
2. User preferences

2.1 Display preferences

2.2 Filtering preferences

2.3 Notification preferences

2.4 Escalation preferences

2.5 Geo Tag preferences

3. Request status
4. Escalate problem

4.1 Create escalation
    4.2 Escalation in progress 5. Remote command     5.1 List of commands
    5.2 Castum commands
    5.3 Cloud Management commands

BUSINESS SYSTEMS MANAGEMENT MOBILE ADMINISTRATION

FIELD

One or more embodiments of the invention relate generally to a method for managing business systems, and in particular to a method and associated system for mobile administration of business systems.

BACKGROUND

Determining system issues typically includes an inaccurate process with little flexibility. Managing the issues may include a complicated process that may be time consuming and require a large amount of resources. Accordingly, there exists a need in the art to overcome at least some of the deficiencies and limitations described herein above.

SUMMARY

A first embodiment of provides a method comprising: enabling for a user, by a computer processor of a mobile device, a software application integrated with analytic models; identifying, by the computer processor in response to the enabling, the user; identifying, by the computer processor in response to the identifying the user, a location of the user, the location associated with an entity; determining, by the computer processor based on user defined data, preferences associated with the user; monitoring, by the computer processor based on the location and the preferences, a status of business processes associated with the entity at the location; determining, by the computer processor based on results of the monitoring, a status of the entity at the location; and presenting to the user, by the computer processor via the mobile device, status data associated with the status, the status data based on the preferences.

A second embodiment provides a computer program product, comprising a computer readable storage device storing a computer readable program code, the computer readable program code comprising an algorithm that when executed by a computer processor of a mobile device implements a method, the method comprising: enabling for a user, by the computer processor, a software application integrated with analytic models; identifying, by the computer processor in response to the enabling, the user; identifying, by the computer processor in response to the identifying the user, a location of the user, the location associated with an entity; determining, by the computer processor based on user defined data, preferences associated with the user; monitoring, by the computer processor based on the location and the preferences, a status of business processes associated with the entity at the location; determining, by the computer processor based on results of the monitoring, a status of the entity at the location; and presenting to the user, by the computer processor via the mobile device, status data associated with the status, the status data based on the preferences.

A third embodiment provides a computer system comprising a computer processor coupled to a computer-readable memory unit, the memory unit comprising instructions that when executed by the computer processor implements a method comprising: enabling for a user, by the computer processor, a software application integrated with analytic models; identifying, by the computer processor in response to the enabling, the user; identifying, by the computer processor in response to the identifying the user, a location of the user, the location associated with an entity; determining, by the computer processor based on user defined data, preferences associated with the user; monitoring, by the computer processor based on the location and the preferences, a status of business processes associated with the entity at the location; determining, by the computer processor based on results of the monitoring, a status of the entity at the location; and presenting to the user, by the computer processor via the mobile device, status data associated with the status, the status data based on the preferences.

The present invention advantageously provides a simple method and associated system capable of determining system issues.

BRIEF DESCRIPTION OF THE DRAWINGS

FIG. 5, including

FIG. 6, including FIGS. 6A and 6B, illustrates an administrative user interface enabled by the system of FIG. 1, in accordance with embodiments of the present invention.

DETAILED DESCRIPTION

Figure 1:
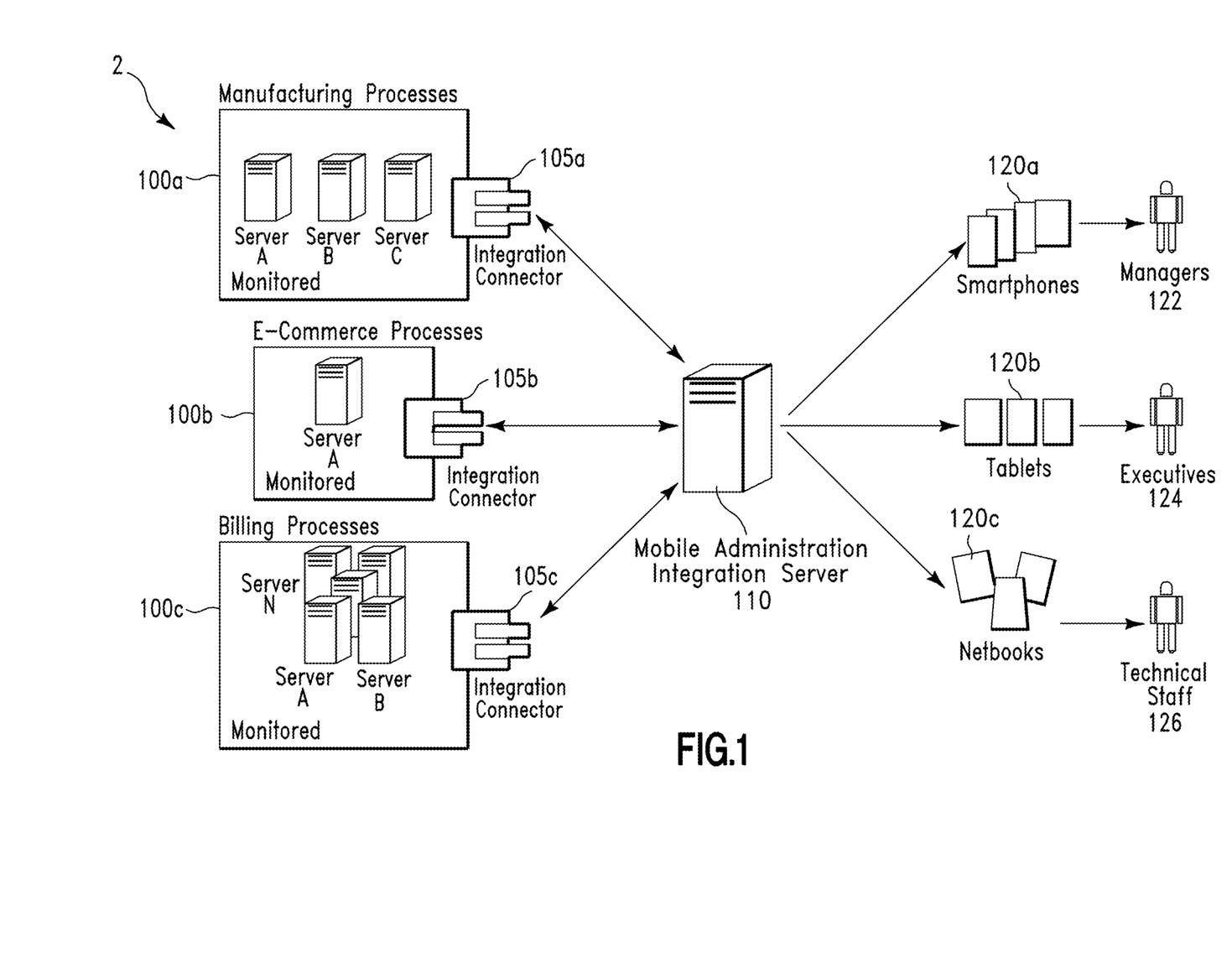
FIG. 1 illustrates a system for enabling a user to access a health status of business processes based on a geographic location service, in accordance with embodiments of the present invention.

FIG. 1 illustrates a system 2 to enable a user to quickly access a health status of business processes, via a mobile device, based on a geographic location service, in accordance with embodiments of the present invention. System 2 is integrated with analytic models, performs an analysis of current business processes supported by IT, and enables a quick response to engage necessary personnel for working on current problems and obtaining status updates. Note that although system 2 is described with respect to the use of GPS as an example of geo positioning technology, additional of geo positioning technology methods (e.g., cellphone tower triangulation, etc.) may be used. System 2 enables a mobile system technology that collects IT environment information via one or more monitoring products from one or more vendors and integrates a deployed solution. The deployed solution is presented via a dashboard view on a mobile device (e.g., a smartphones, a tablet, a netbook, etc.) so that a manager or executive is able to quickly access and understand how well IT systems and infrastructures (i.e., that support company processes) are performing. The dashboard view is delivered via real time reports in a business context (e.g., how a business process supported by a group of servers is performing). Additionally, system 2 enables a user to initiate actions such as, inter alia, starting a conference, taking corrective actions, etc.

System 2 of FIG. 1 comprises a mobile administration integration server 110 connected between business systems 100a . . . 100c and mobile devices 120a . . . 120c. Business systems 100a . . . 100c may comprise any type of server or computing systems. Business systems 100a . . . 100c may be used to implement any type of business systems used to implements business processes such as, inter alia, manufacturing processes, E-commerce processes, billing processes, etc. Mobile administration integration server 110 may comprise any type of computing system. Mobile devices 120a . . . 120c may comprise any type of mobile device including, inter alia, cellular phones, smart phones, tablet computers, netbook computers, PDAs, etc. Mobile devices 120a . . . 120c are used by individuals (e.g., managers, executives, technical staff, etc.) to review business system health.

Mobile administration integration server 110 communicates with external system management tools (of business systems 100a . . . 100c) responsible for monitoring a health of an IT environment and providing a status of a current IT environment deployed. The management tools provide an IT status from a component level or an application and business system level. Each of business systems 100a . . . 100c comprises an integration connector (i.e., one of integration connectors 105a . . . 105c) that collects relevant information from the management tools. The collected information enables users (that are registered in system 2) a standard dashboard view of the health of company's business systems deployed by the IT environment. This view presents a health status in real time and may be accessed using any type of computer device such as, inter alia, smartphones, desktop computers, etc. Based on a profile and location, a user may view a health status of a business system running at the location. Additionally, the user is able to contact or escalate a responsible party associated with for any event being reported. For example, if a manager is at specific location, system 2 will identify that the manager is located at the factory (e.g., using Geo Tag technology) and present a health of the business processes that run or support a specific department located at the location of the factory.

System 2 enables a user to quickly access a health of business systems based in a GPS location. Additionally, system 2 enables a user to initiate an action from a mobile device. For example, a user may initiate a conference call with a party responsible for an IT environment related to an alerted problem. System 2 enables the following functions associated with collection of geo data:
1. Consolidation of data (from various IT systems management vendor's products associated with business management information input from managers) into a single standardized dashboard comprising categories and filtering attributes.
2. Processing alerts based on assigned filtering attributes.
3. Identifying impacted business (e.g., business health) based on a GPS location.
4. Classifying pertinent information based on business needs (e.g., filtered information).
5. Enabling escalation of an issue to associated management and appropriate technical staff based on severity, impact, etc.

In order to collect geo data, mobile administration integration server 110 retrieves information thereby enabling a centralized method for retrieval of geo data from business systems 100a . . . 100c. The centralized geo data comprises business impact data geo location information and escalation data.

The collected geo data comprises information associated with a mean time to resolve (MTTR), based on analytic models, if the information is available from IT systems management vendor products. For example, a manager is traveling to a branch office or a plant. When the manager arrives a health status of business processes that are running at that location is requested. In response, the manager enables a mobile device and based on a geo tag location, an application presents (to the manager) information describing problems related to related business processes and a specified time period for repair based on analytic models. The presented information allows the manager to initiate an action from a mobile device. Additionally, system 2 comprises a geo tag disabled option allowing a user to define mobile GPS functions that will not be used by a client agent (i.e., as an additional filtering layer for the location). An escalation option indicates preference of conference mechanisms to be used (e.g., video meeting, mobile teleconference, chat services, a blog, etc.) as well as notification channels (e.g., SMS, e-mail, web site, web services, etc.) and escalation contacts associated with events. The conference mechanisms allow users to be aware of last status updates of each impacted system. System 2 allows presentation of impacted business systems based on user's preferences. When a user receives information, the user will have the capability to escalate a problem by selection and forwarding an escalation to a higher level. The following process describes an implementation example enabled by system 2:

A company's executive arrives at a manufacturing plant (belonging to company A) comprising enabled business processes. The executive makes a request (via a mobile device) to determine a health of company A's manufacturing systems. An application (on mobile administration integration server 110 via a mobile device) identifies the executive's location (based on a geo tag location) and the executive's preference (i.e., manufacturing processes). In response, the application processes impacted systems by selecting a status of manufacturing processes at the location. This selection search an application database that is continuously receiving status updates from various IT systems and monitoring products deployed in the company systems. Additionally, the application categorizes an impact based on a location, a business process, an impact, and a severity. The application will additionally leverage business analytics to identify a mean time to resolve (MTTR) time to repair a reported problem. The mobile administration integration server 110 (via a mobile device) displays a business health of manufacturing plant. In formation is displayed based the executive's preference. In response, the executive may select any event and initiate an escalation process (with a responsible party) by transmitting a message (to the responsible party) and copying a manager or initiating a conference through a mobile device.

Figure 2:
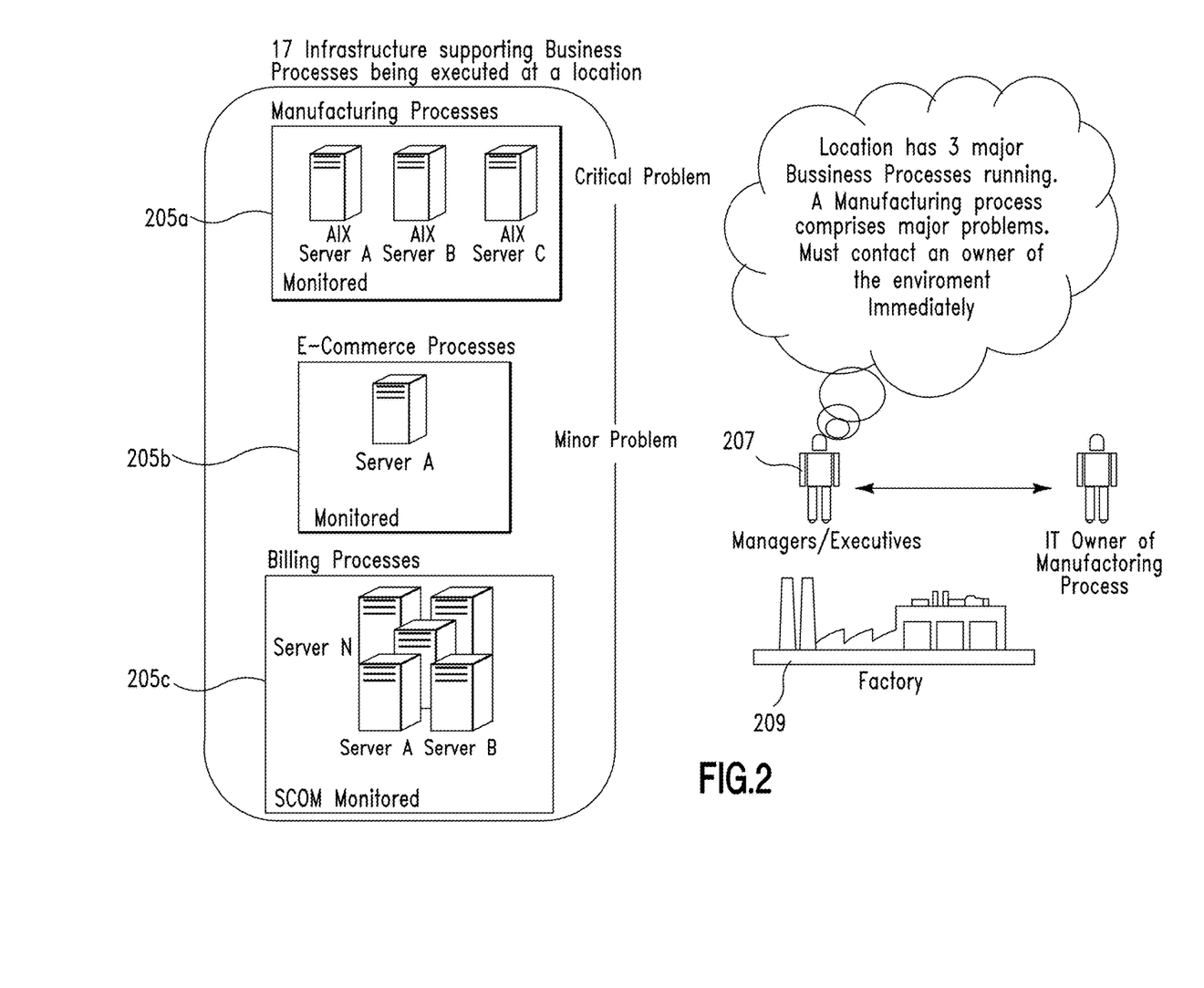
FIG. 2 illustrates an implementation scenario enabled by the system of FIG. 1, in accordance with embodiments of the present invention.

FIG. 2 illustrates an implementation scenario enabled by system 2 of FIG. 1 to enable a user to quickly access a health status of business processes based on a geographic location service, in accordance with embodiments of the present invention. FIG. 2 illustrates a manager/executive 207 arriving at a factory location 209. The manager/executive 207 accesses system 2 and identifies three business process 205a . . . 205c running at the factory location 209. The identification process is enabled by mobile administration integration server 110 of FIG. 1. Mobile administration integration server 110 collects information from business processes 205a . . . 205c via IT system management tools. A geo positioning identification process is enabled and based on a location of the manager/executive 207 and an associated profile, business process 205a . . . 205c are identified. Mobile administration integration server 110 reports a health status of business processes 205a . . . 205c via a mobile device. In response, the manager/executive 207 initiates an action via the mobile device. For example, a conference call describing the health status is initiated.

Figure 3:
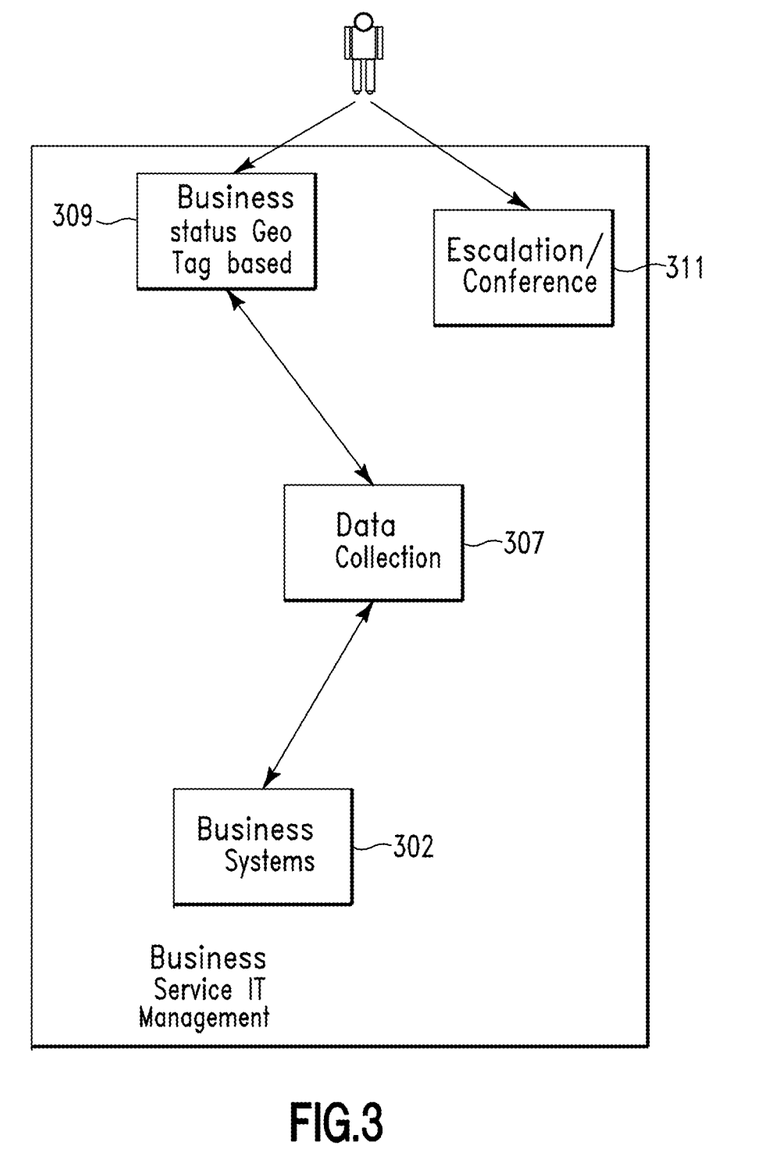
FIG. 3 illustrates a high level architectural diagram of the system of FIG. 1, in accordance with embodiments of the present invention.

FIG. 3 illustrates a high level architectural diagram of system 2 of FIG. 1, in accordance with embodiments of the present invention. The architectural diagram of FIG. 3 comprises a data collection component 307 for capturing input data (e.g., business systems monitoring and configuration data) from business systems 302 and categorizing a business impact by category (e.g., location, area, business service, etc.). Additionally, data collection component 307 defines a risk associated with a business impact (based in a matrix of criticality) and a mean time to resolve (MTTR) if required attributes for calculation are available. A presentation layer comprised of a business status view component 309 and conference/escalation function component 311 displays information to user based on user location. Conference/escalation function component 311 enables a conference/escalation per user request and notification preferences.

Figure 4:
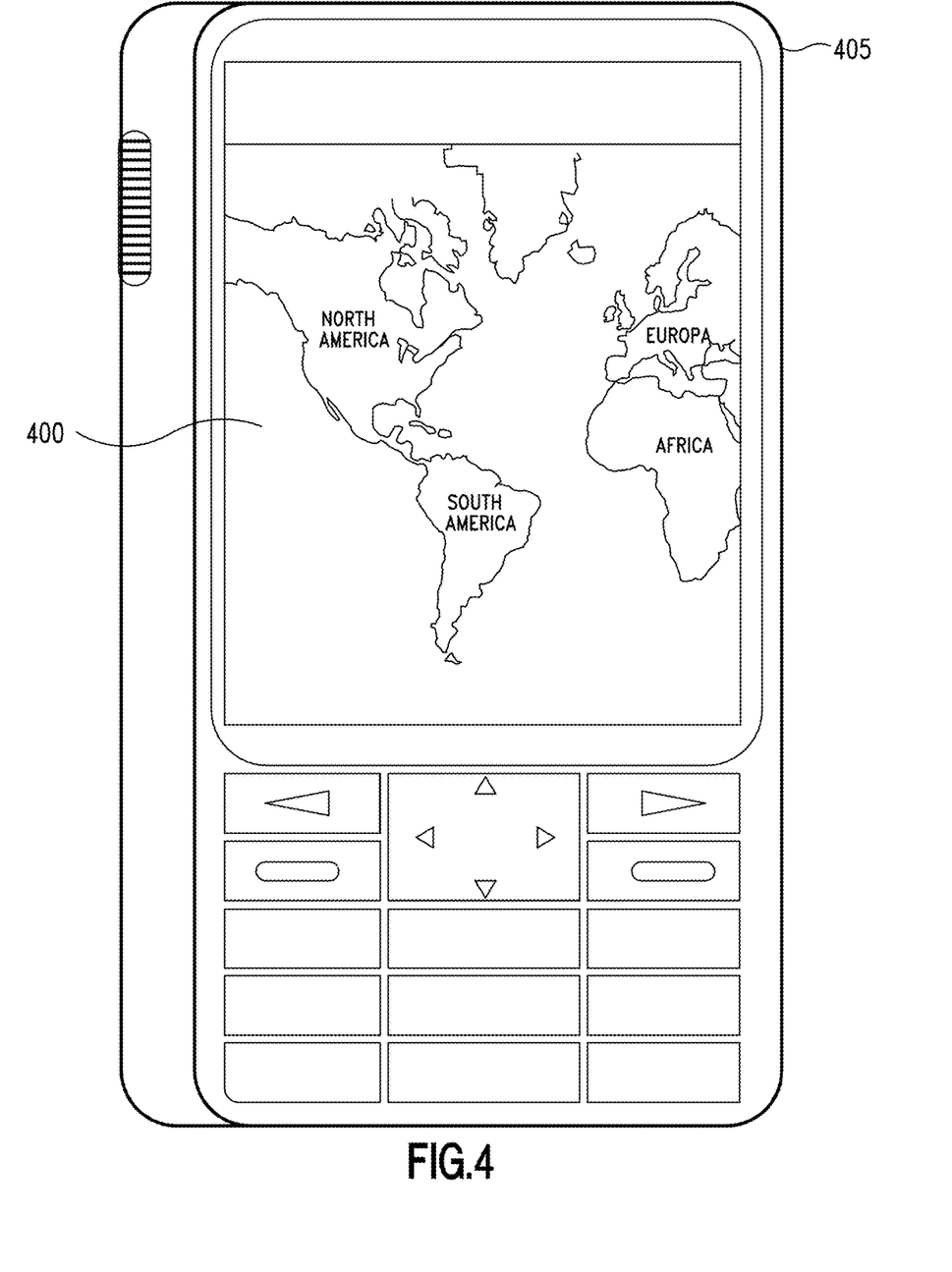
FIG. 4 illustrates a dashboard user interface enabled by the system of FIG. 1, in accordance with embodiments of the present invention.

FIG. 4 illustrates a dashboard user interface 400 enabled by system 2 of FIG. 1, in accordance with embodiments of the present invention. Dashboard user interface 400 is presented via a mobile computing device 405. Dashboard user interface 400 presents an initial screen illustrating a high level view of all business process statuses defined for a user based on a geo tag associated with a user defined preference. A lower level view may be implemented by touch screen functions or clicking over a status.

Figure 5A:
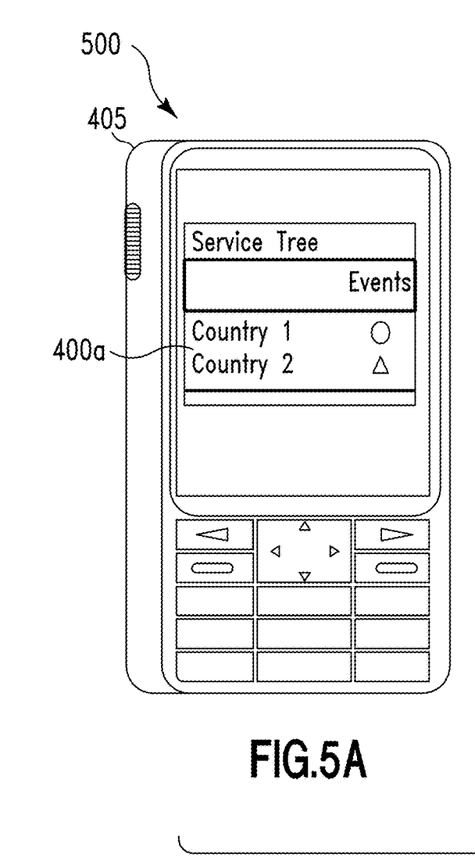
FIGS. 5A-5C, illustrates alternative views of the dashboard user interface of FIG. 4, in accordance with embodiments of the present invention.
Figure 5B:
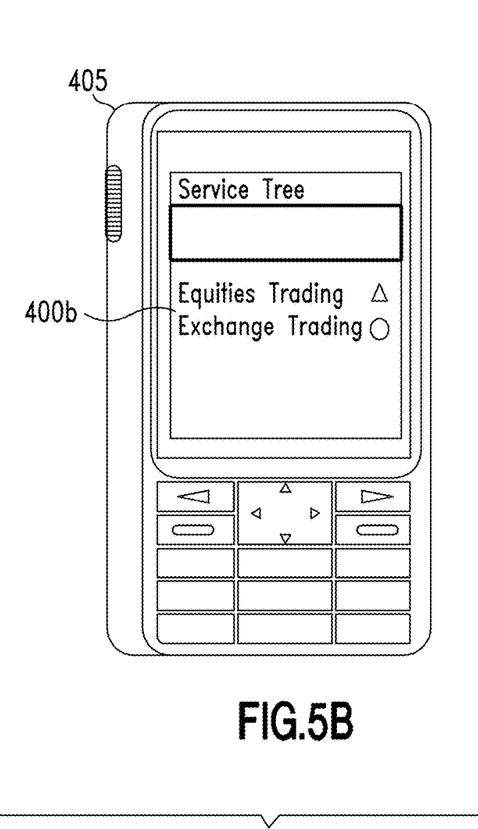
Figure 5C:
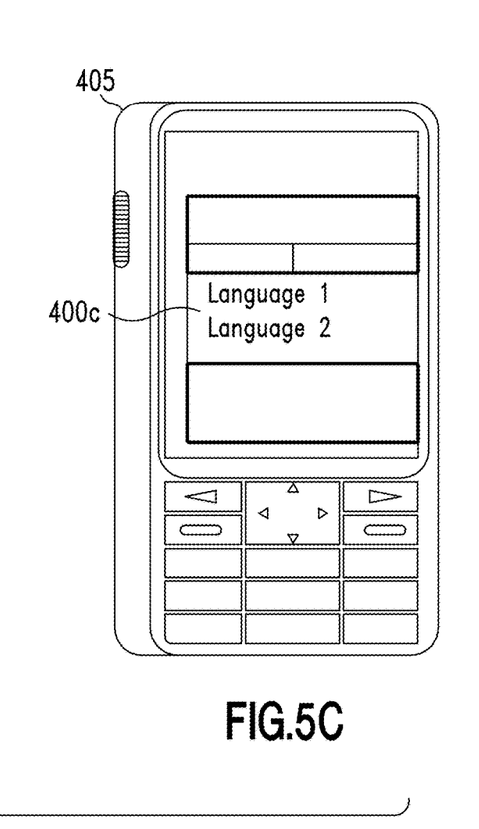

FIG. 5, including FIGS. 5A-5C, illustrates alternative views 500 of dashboard user interface 400 comprised by mobile computing device 405 of FIG. 4, in accordance with embodiments of the present invention. Alternative views 500 comprise dashboard user interface views 400a, 400b, and 400c. Each of dashboard user interface views 400a, 400b, and 400c comprise a different level of business process statuses.

Figures 6, 6B:
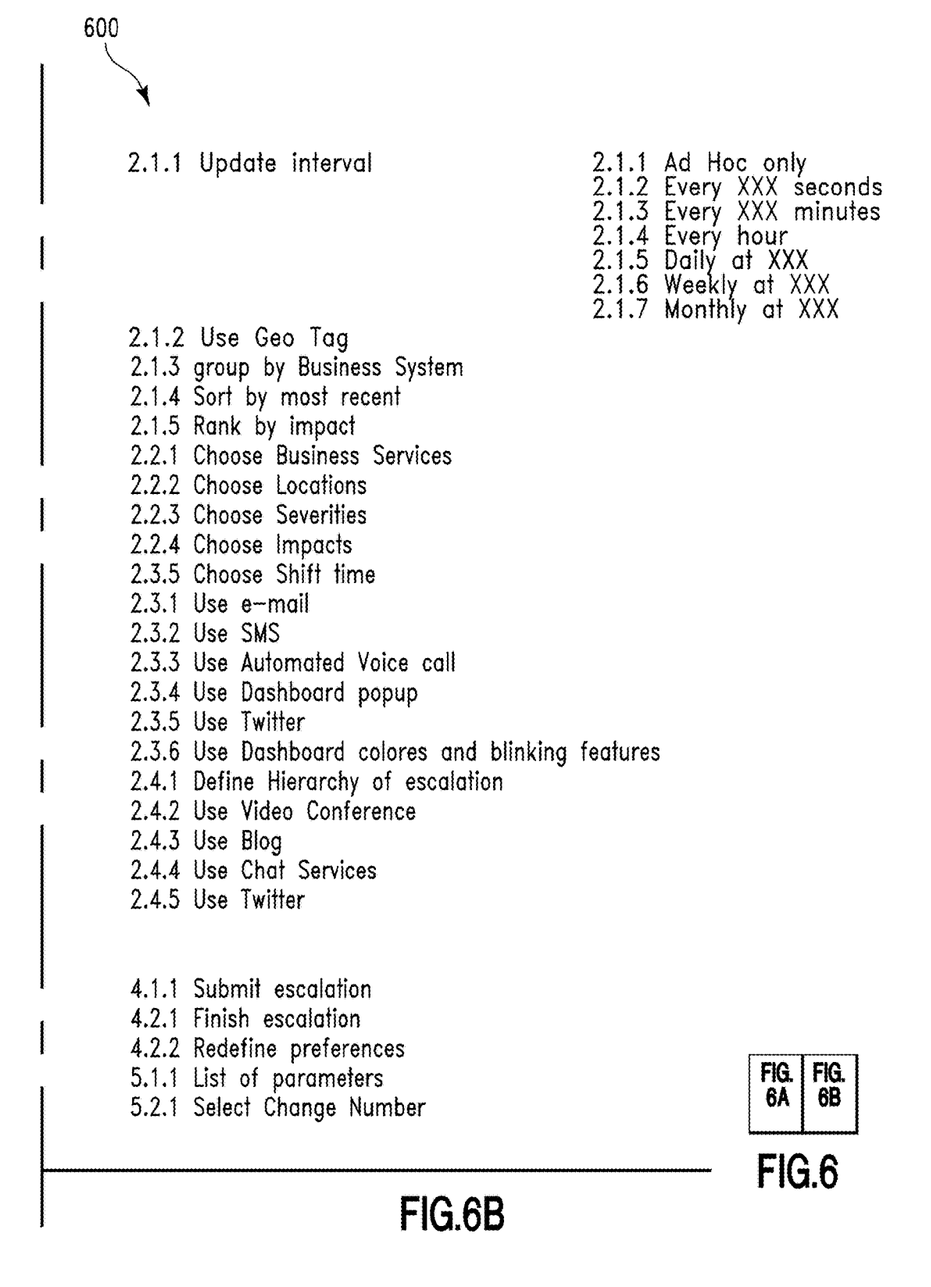
Figure 6A:
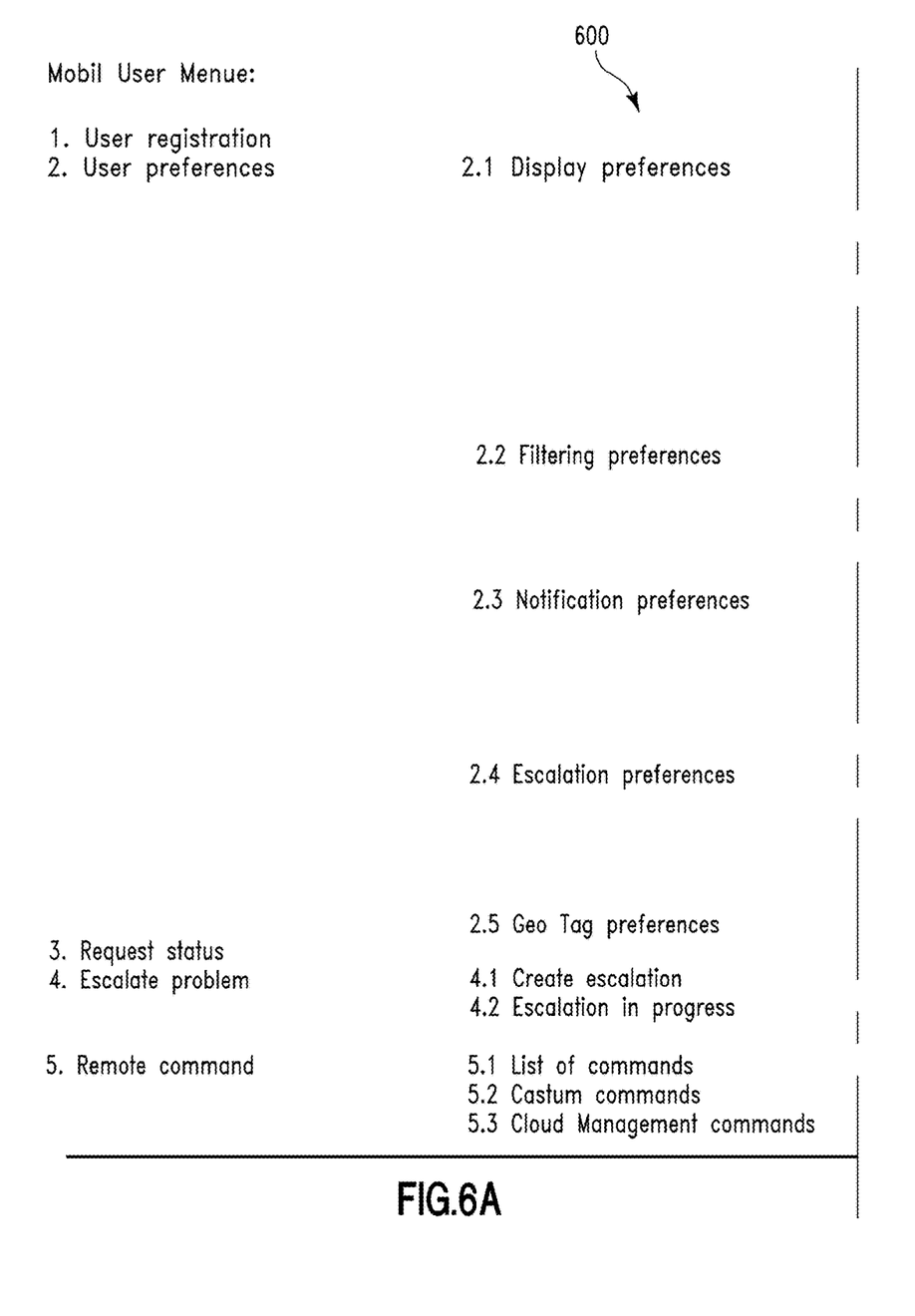

FIG. 6, including FIGS. 6A and 6B, illustrates an administrative user interface 600 enabled by system 2 of FIG. 1, in accordance with embodiments of the present invention. Administrative user interface 600 comprises an administration interface used to administer user configuration data and settings. Multiple capabilities such as, inter alia, display, filtering, notification, escalation, geo tag preferences, etc., may be deployed. Additionally, administrative tasks such as, inter alia, requesting a status of problems, viewing an escalation status, running remote commands to an IT environment, etc., may be performed using administrative user interface 600.

Figure 7:
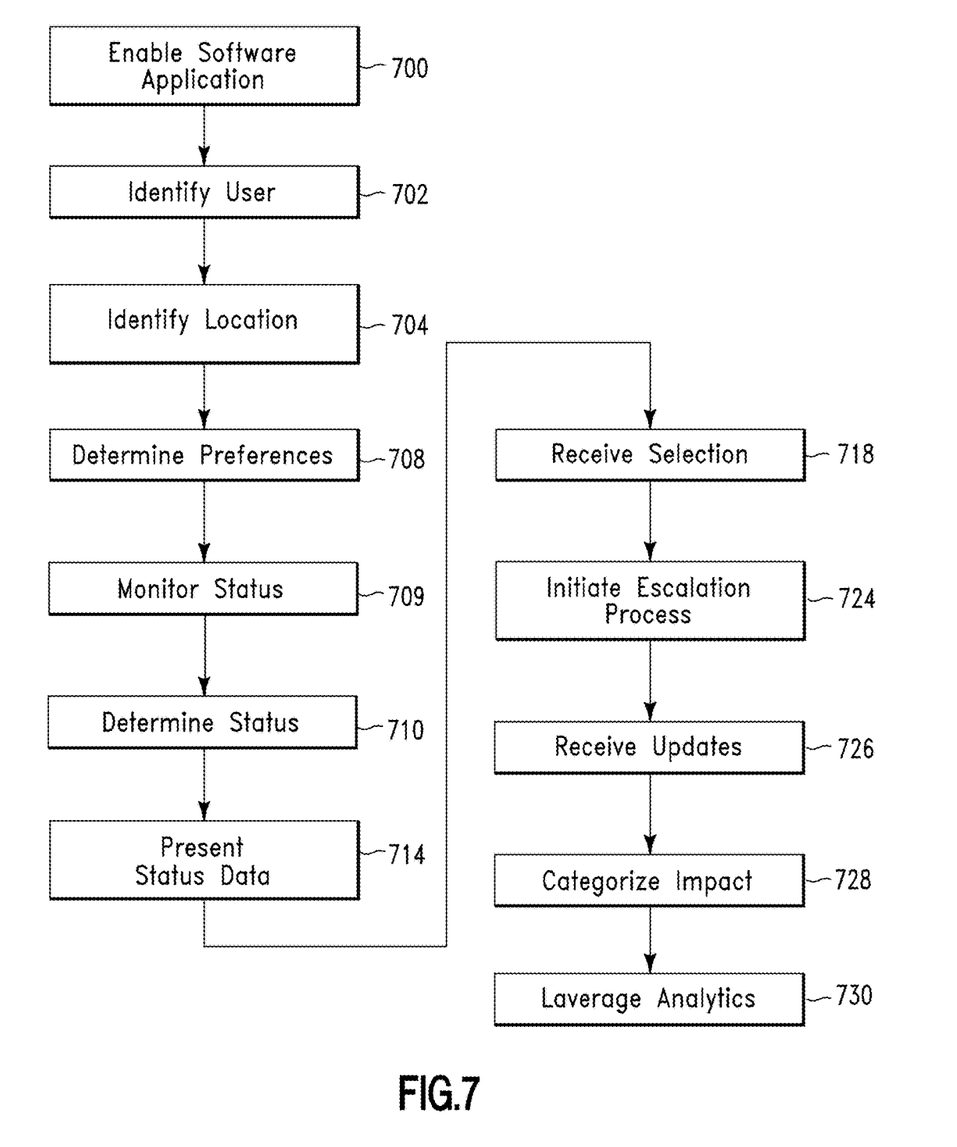
FIG. 7 illustrates an algorithm detailing a process flow enabled by the system of FIG. 1 for accessing a health status of business processes, in accordance with embodiments of the present invention.

FIG. 7 illustrates an algorithm detailing a process flow enabled by system 2 of FIG. 1 for accessing a health status of business processes, via a mobile device, based on a geographic location service, in accordance with embodiments of the present invention. Each of the steps in the algorithm of FIG. 3 may be enabled and executed by a computer processor executing computer code. In step 700, a user (via a mobile device) enables a software application integrated with analytic models. In step 702, the user is identified. In step 704, (in response to identifying said user) a location of the user and associated with an entity is identified. In step 708, (based on user defined data) preferences associated with the user are determined. In step 709, a status of business processes associated with the entity at the location is monitored. In step 710, a status of the entity at the location is determined based on results of the monitoring in step 709. In step 714, status data (associated with the status of the entity) is presented to the user. The status data is based on the preferences. In step 718, a selection for an event associated with the status data is received from the user. In step 724, an escalation process associated with the event is initiated based on the selection. In step 726, status updates associated with systems of the entity are continuously received from multiple IT systems of the entity. In step 728, an impact of the status is categorized based on the location, the business process, an impact, and a severity. In step 730, business analytics to identify a mean time to resolve (MTTR) time to fix a reported problem associated with status of the entity are leveraged.

Figure 8:
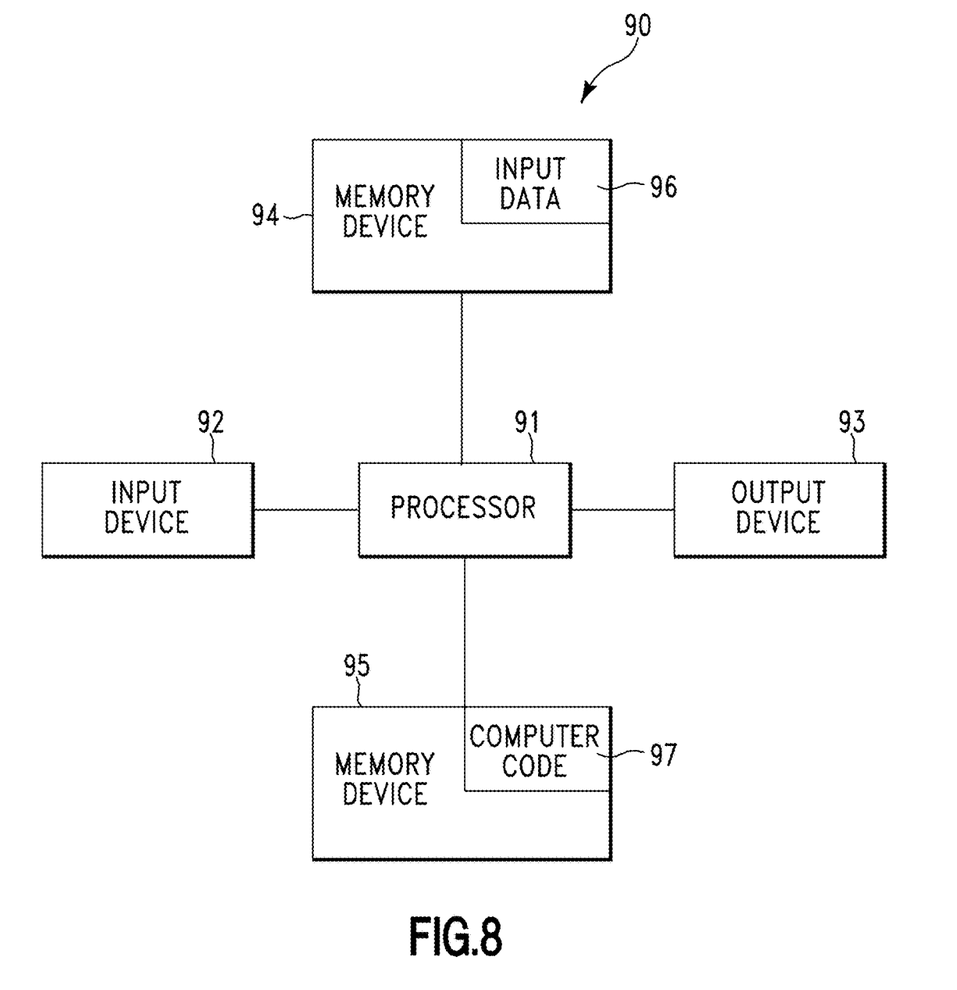
FIG. 8 illustrates a computer apparatus used by the system of FIG. 1 to enable a user to access a health status of business processes based on a geographic location service, in accordance with embodiments of the present invention.

FIG. 8 illustrates a computer apparatus 90 (e.g., mobile administration integration server 110 of FIG. 1) used by system 2 of FIG. 1 to enable a user to quickly access a health status of business processes, via a mobile device, based on a geographic location service, in accordance with embodiments of the present invention. The computer system 90 includes a processor 91, an input device 92 coupled to the processor 91, an output device 93 coupled to the processor 91, and memory devices 94 and 95 each coupled to the processor 91. The input device 92 may be, inter alia, a keyboard, a mouse, etc. The output device 93 may be, inter alia, a printer, a plotter, a computer screen, a magnetic tape, a removable hard disk, a floppy disk, etc. The memory devices 94 and 95 may be, inter alia, a hard disk, a floppy disk, a magnetic tape, an optical storage such as a compact disc (CD) or a digital video disc (DVD), a dynamic random access memory (DRAM), a read-only memory (ROM), etc. The memory device 95 includes a computer code 97. The computer code 97 includes algorithms (e.g., the algorithm of FIG. 7) to enable a user to quickly access a health status of business processes, via a mobile device, based on a geographic location service. The processor 91 executes the computer code 97. The memory device 94 includes input data 96. The input data 96 includes input required by the computer code 97. The output device 93 displays output from the computer code 97. Either or both memory devices 94 and 95 (or one or more additional memory devices not shown in FIG. 8) may include the algorithm of FIG. 7 and may be used as a computer usable medium (or a computer readable medium or a program storage device) having a computer readable program code embodied therein and/or having other data stored therein, wherein the computer readable program code includes the computer code 97. Generally, a computer program product (or, alternatively, an article of manufacture) of the computer system 90 may include the computer usable medium (or the program storage device).

Still yet, any of the components of the present invention could be created, integrated, hosted, maintained, deployed, managed, serviced, etc. by a service supplier who offers to enable a user to quickly access a health status of business processes, via a mobile device, based on a geographic location service. Thus the present invention discloses a process for deploying, creating, integrating, hosting, maintaining, and/or integrating computing infrastructure, including integrating computer-readable code into the computer system 90, wherein the code in combination with the computer system 90 is capable of performing a method to enable a user to quickly access a health status of business processes, via a mobile device, based on a geographic location service.

In another embodiment, the invention provides a business method that performs the process steps of the invention on a subscription, advertising, and/or fee basis. That is, a service supplier, such as a Solution Integrator, could offer to enable a user to quickly access a health status of business processes, via a mobile device, based on a geographic location service. In this case, the service supplier can create, maintain, support, etc. a computer infrastructure that performs the process steps of the invention for one or more customers. In return, the service supplier can receive payment from the customer(s) under a subscription and/or fee agreement and/or the service supplier can receive payment from the sale of advertising content to one or more third parties.

While FIG. 8 shows the computer system 90 as a particular configuration of hardware and software, any configuration of hardware and software, as would be known to a person of ordinary skill in the art, may be utilized for the purposes stated supra in conjunction with the particular computer system 90 of FIG. 8. For example, the memory devices 94 and 95 may be portions of a single memory device rather than separate memory devices.

While embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A mobile system based monitoring and health status update method comprising:

enabling for a user, by a computer processor of a mobile device, a software application integrated with analytic models;

identifying, by said computer processor in response to said enabling, said user;

identifying in response to said identifying said user, by said computer processor executing a global positioning satellite (GPS) sensor within said mobile device, a location of said user, said location comprising a GPS geo tagged location associated with an entity;

disabling, by said computer processor, specified additional geo tagged locations associated with specified GPS functions not to be used by client agents associated with said user;

disabling by said computer processor, geo tags associated with said specified additional geo tagged locations thereby defining mobile GPS functions that will not be used by devices of said client agents;

determining, by said computer processor based on user defined data and said specified additional geo tagged locations, preferences associated with said user;

monitoring via an integration server connected through specialized integration connectors to business process servers, by said computer processor based on said location and said preferences, a health status of business processes associated with said entity at said location, said business processes executed by said business process servers;

consolidating, by said computer processor, data associated with said processes into a single standardized realtime dashboard user interface comprising categories and filtering attributes illustrating a high level view of statuses associated with said business processes statuses defined for said user based on a geo tag associated with user defined preferences;

processing, by said computer processor based on said filtering attributes, alerts associated with said statuses;

identifying, by said computer processor, impacted businesses of said entity based on said GPS geo tagged location;

classifying, by said computer processor, information based on said filtering attributes;

enabling, by said computer processor based on results of said classifying, escalation of an issue to associated management and technical staff, of said entity, based on a severity and impact of said issue;

determining, by said computer processor based on results of said monitoring and said enabling, a status of said entity at said location;

presenting to said user, by said computer processor via said single standardized realtime dashboard user interface presented on a display of said mobile device, status data associated with said status of said entity, said status data based on said preferences and specifying hardware component level issues of said business process servers;

receiving, by said computer processor from said user via a touch screen function of said single standardized realtime dashboard user interface, a selection for an event associated with said status data;

initiating, by said computer processor based on said selection, an escalation process associated with said event, said escalation process associated with a repair, during a specified time period, of components of said business process servers specified by said hardware component level issues;

continuously receiving in real time, by said computer processor from deployed IT systems of said entity, status updates associated with said deployed IT systems of said entity, wherein said monitoring said status of said business processes comprises monitoring said status updates;

generating, by said computer processor based on analyzing said event, said escalation process, and said status updates, modified status data illustrating differences from said status data;

presenting to said user, by said computer processor via said single standardized realtime dashboard user interface presented on said display of said mobile device, said modified status data associated with an updated status of said entity;

monitoring, by said computer processor, a health and performance of hardware components of a deployed IT system, of said deployed IT systems, implementing said business processes;

providing, by said computer processor to said user in realtime, hardware component level statuses for said hardware components of said deployed IT system;

determining, by said computer processor based on said health and performance of said hardware components and said hardware component level statuses, current problems associated with said deployed IT system;

executing, by said computer processor, remote commands with respect to said current problems associated with said deployed IT system; and enabling, by said processor, a deployed solution for said current problems associated with said deployed IT system resulting in a mobile system technology improvement for retrieving IT environment information, of said deployed IT system, via said monitoring said health and performance of said hardware components, wherein said enabling said deployed solution comprises:
escalating a status of said current problems to a higher level system;
running remote commands associated with taking corrective actions to resolve said current problems and improve a performance of said deployed IT system; and
automatically initiating in response to said running remote commands, communications between said mobile device and a device associated with said deployed IT system.

2. The method of claim 1, wherein said escalation process comprises:
transmitting a message, indicating said event, to an individual responsible for correcting said event.

3. The method of claim 1, wherein said escalation process comprises:
initiating a conference with an individual responsible for correcting said event.

4. The method of claim 1, wherein said identifying said location of said user comprises using a geo-positioning technology.

5. The method of claim 4, wherein said geo-positioning technology comprises a technology selected from the group consisting of a global positioning satellite technology and a cellular telephone tower triangulation technology.

6. The method of claim 1, wherein said status of said entity indicates problems associated with said entity.

7. The method of claim 1, further comprising:
categorizing, by said computer processor, an impact of said status of said entity based on said location, said business process, an impact, and a severity; and
leveraging, by said computer processor, business analytics to identify a mean time to resolve (MTTR) time to fix a reported problem associated with said status of said entity.

8. The method of claim 1, wherein said status of said entity indicates a business health of said entity.

9. The method of claim 1, further comprising: providing a process for supporting computer infrastructure, said process comprising providing at least one support service for at least one of creating, integrating, hosting, maintaining, and deploying computer-readable code in the computing apparatus, wherein the code in combination with the computing apparatus is configured to perform the method of claim 1.

10. A computer program product, comprising a non-transitory computer readable hardware storage device storing a computer readable program code, said computer readable program code comprising an algorithm that when executed by a computer processor of a mobile device implements mobile system based monitoring and health status update method, said method comprising:
enabling for a user, by said computer processor, a software application integrated with analytic models;
identifying, by said computer processor in response to said enabling, said user;
identifying in response to said identifying said user, by said computer processor executing a global positioning satellite (GPS) sensor within said mobile device, a location of said user, said location comprising a GPS geo tagged location associated with an entity;
disabling, by said computer processor, specified additional geo tagged locations associated with specified GPS functions not to be used by client agents associated with said user;
disabling by said computer processor, geo tags associated with said specified additional geo tagged locations thereby defining mobile GPS functions that will not be used by devices of said client agents;
determining, by said computer processor based on user defined data and said specified additional geo tagged locations, preferences associated with said user;
monitoring via an integration server connected through specialized integration connectors to business process servers, by said computer processor based on said location and said preferences, a health status of business processes associated with said entity at said location, said business processes executed by said business process servers;
consolidating, by said computer processor, data associated with said processes into a single standardized realtime dashboard user interface comprising categories and filtering attributes illustrating a high level view of statuses associated with said business processes statuses defined for said user based on a geo tag associated with user defined preferences;
processing, by said computer processor based on said filtering attributes, alerts associated with said statuses;
identifying, by said computer processor, impacted businesses of said entity based on said GPS geo tagged location;
classifying, by said computer processor, information based on said filtering attributes;
enabling, by said computer processor based on results of said classifying, escalation of an issue to associated management and technical staff, of said entity, based on a severity and impact of said issue;
determining, by said computer processor based on results of said monitoring and said enabling, a status of said entity at said location;
presenting to said user, by said computer processor via said single standardized realtime dashboard user interface presented on a display of said mobile device, status data associated with said status of said entity, said status data based on said preferences and specifying hardware component level issues of said business process servers;
receiving, by said computer processor from said user via a touch screen function of said single standardized realtime dashboard user interface, a selection for an event associated with said status data;
initiating, by said computer processor based on said selection, an escalation process associated with said event, said escalation process associated with a repair of component, during a specified time period, of said business process servers specified by said hardware component level issues;
continuously receiving in real time, by said computer processor from deployed IT systems of said entity, status updates associated with said deployed IT systems of said entity, wherein said monitoring said status of said business processes comprises monitoring said status updates;
generating, by said computer processor based on analyzing said event, said escalation process, and said status updates, modified status data illustrating differences from said status data;
presenting to said user, by said computer processor via said single standardized realtime dashboard user interface presented on said display of said mobile device, said modified status data associated with an updated status of said entity;

monitoring, by said computer processor, a health and performance of hardware components of a deployed IT system, of said deployed IT systems, implementing said business processes;

providing, by said computer processor to said user in realtime, hardware component level statuses for said hardware components of said deployed IT system;

determining, by said computer processor based on said health and performance of said hardware components and said hardware component level statuses, current problems associated with said deployed IT system;

executing, by said computer processor, remote commands with respect to said current problems associated with said deployed IT system; and enabling, by said processor, a deployed solution for said current problems associated with said deployed IT system resulting in a mobile system technology improvement for retrieving IT environment information, of said deployed IT system, via said monitoring said health and performance of said hardware components, wherein said enabling said deployed solution comprises:

escalating a status of said current problems to a higher level system;

running remote commands associated with taking corrective actions to resolve said current problems and improve a performance of said deployed IT system; and automatically initiating in response to said running remote commands, communications between said mobile device and a device associated with said deployed IT system.

11. The computer program product of claim 10, wherein said escalation process comprises:

transmitting a message, indicating said event, to an individual responsible for correcting said event.

12. The computer program product of claim 10, wherein said escalation process comprises:

initiating a conference with an individual responsible for correcting said event.

13. The computer program product of claim 10, wherein said identifying said location of said user comprises using a geo-positioning technology.

14. The computer program product of claim 13, wherein said geo-positioning technology comprises a technology selected from the group consisting of a global positioning satellite technology and a cellular telephone tower triangulation technology.

15. A computer system comprising a computer processor coupled to a computer-readable memory unit, said memory unit comprising instructions that when executed by the computer processor implements mobile system based monitoring and health status update method comprising:

enabling for a user, by said computer processor, a software application integrated with analytic models;

identifying, by said computer processor in response to said enabling, said user;

identifying in response to said identifying said user, by said computer processor executing a global positioning satellite (GPS) sensor within said mobile device, a location of said user, said location comprising a GPS geo tagged location associated with an entity;

disabling, by said computer processor, specified additional geo tagged locations associated with specified GPS functions not to be used by client agents associated with said user;

disabling by said computer processor, geo tags associated with said specified additional geo tagged locations thereby defining mobile GPS functions that will not be used by devices of said client agents;

determining, by said computer processor based on user defined data and said specified additional geo tagged locations, preferences associated with said user;

monitoring via an integration server connected through specialized integration connectors to business process servers, by said computer processor based on said location and said preferences, a health status of business processes associated with said entity at said location, said business processes executed by said business process servers;

consolidating, by said computer processor, data associated with said processes into a single standardized realtime dashboard user interface comprising categories and filtering attributes illustrating a high level view of statuses associated with said business processes statuses defined for said user based on a geo tag associated with user defined preferences;

processing, by said computer processor based on said filtering attributes, alerts associated with said statuses;

identifying, by said computer processor, impacted businesses of said entity based on said GPS geo tagged location;

classifying, by said computer processor, information based on said filtering attributes;

enabling, by said computer processor based on results of said classifying, escalation of an issue to associated management and technical staff, of said entity, based on a severity and impact of said issue;

determining, by said computer processor based on results of said monitoring and said enabling, a status of said entity at said location;

presenting to said user, by said computer processor via said single standardized realtime dashboard user interface presented on a display of said mobile device, status data associated with said status of said entity, said status data based on said preferences and specifying hardware component level issues of said business process servers;

receiving, by said computer processor from said user via a touch screen function of said single standardized realtime dashboard user interface, a selection for an event associated with said status data;

initiating, by said computer processor based on said selection, an escalation process associated with said event, said escalation process associated with a repair, during a specified time period, of components of said business process servers specified by said hardware component level issues;

continuously receiving in real time, by said computer processor from deployed IT systems of said entity, status updates associated with said deployed IT systems of said entity, wherein said monitoring said status of said business processes comprises monitoring said status updates;

generating, by said computer processor based on analyzing said event, said escalation process, and said status updates, modified status data illustrating differences from said status data;

presenting to said user, by said computer processor via said single standardized realtime dashboard user interface presented on said display of said mobile device, said modified status data associated with an updated status of said entity;

monitoring, by said computer processor, a health and performance of hardware components of a deployed IT system, of said deployed IT systems, implementing said business processes;

providing, by said computer processor to said user in realtime, hardware component level statuses for said hardware components of said deployed IT system;

determining, by said computer processor based on said health and performance of said hardware components and said hardware component level statuses, current problems associated with said deployed IT system;

executing, by said computer processor, remote commands with respect to said current problems associated with said deployed IT system; and enabling, by said processor, a deployed solution for said current problems associated with said deployed IT system resulting in a mobile system technology improvement for retrieving IT environment information, of said deployed IT system, via said monitoring said health and performance of said hardware components, wherein said enabling said deployed solution comprises:

escalating a status of said current problems to a higher level system;

running remote commands associated with taking corrective actions to resolve said current problems and improve a performance of said deployed IT system; and automatically initiating in response to said running remote commands, communications between said mobile device and a device associated with said deployed IT system.

16. The method of claim 1, wherein performing the method comprises executing computer code by the processor, and wherein a hardware storage device of the mobile device includes a read only memory (ROM) that stores the computer code.

* * * * *